United States Patent [19]

Umezu

[11] Patent Number: 5,467,340
[45] Date of Patent: Nov. 14, 1995

[54] TIME DIVISION SWITCH

[75] Inventor: Akira Umezu, Tokyo, Japan

[73] Assignee: NEC Corporation, Tokyo, Japan

[21] Appl. No.: 180,913

[22] Filed: Jan. 12, 1994

[30] Foreign Application Priority Data

Jan. 13, 1993 [JP] Japan ................... 5-003711

[51] Int. Cl.$^6$ ............................... H04L 12/26
[52] U.S. Cl. ................ 370/14; 370/58.2; 371/20.4; 371/21.2; 371/21.6
[58] Field of Search ............... 370/13, 17, 58.1, 370/58.7, 58.3, 14; 371/20.1, 20.4, 21.1, 21.2, 21.6, 24, 27, 29.1

[56] References Cited

U.S. PATENT DOCUMENTS 3,909,562  9/1975  Lager ........................... 370/14
5,077,744  12/1991 Trainer et al. ................ 371/21.2
5,117,393  5/1992  Miyazawa et al. ........... 371/21.2
5,305,331  4/1994  Sato et al. .................... 371/20.4

Primary Examiner—Benedict V. Safourek
Attorney, Agent, or Firm—Whitham, Curtis, Whitham & McGinn

[57] ABSTRACT

A time division switch for digital exchange systems that includes speech data storage device to store digitally coded speech data transmitted on the data highway, control data storage device to store control data for control of input/output of speech data at the speech data storage device, address generation device to generate sequential addresses to read/write data for said speech data storage device and said control data storage device, write device to write data to said speech data storage device according to the sequential addresses generated by said address generation device, read device to read data from said speech data storage device according to the control data stored in said control data storage device and test execution device to switch between normal mode for processing of said speech data and test mode to check for any failure in said speech data storage device and said control data storage device.

7 Claims, 10 Drawing Sheets

TIME DIVISION SWITCH

BACKGROUNDS OF THE INVENTION

1. Field of the Invention

The present invention relates to a time division switch used in digital exchange systems and particularly relates to a time division switch enabling effective execution of failure detection test for such time division switch.

2. Description of the Related Art

One of the most distinctive characteristics of the digital exchange system is its time division for exchange where one speech bus carries digital (PCM) signals by means of time division multiplexing. To exchange such digital signals, a digital exchange system comprises semiconductor devices such as memory switches and gate switches for message channels. Both of the memory switch and gate switch are widely and generally utilized applications of LSI technology. They are advantageous to obtain more economical systems of smaller size.

The message channel in a digital exchange system has, as a main component, a semiconductor device called "Time Division Switch" (Time switch or "TDSW"), which can input data to the time slots. The time switch comprises, for data replacement, memory devices capable of writing, storing and reading voice information bit strings. It is difficult from the viewpoint of engineering, however, to constitute a large scale digital message channel with a time switch alone, when considering the operation speed of such memory devices.

The time switch is an indispensable element in a message channel for a digital exchange system. It comprises speech path memories (hereinafter referred to as "SPM"), which are memory devices corresponding to the voice information bit strings as described above, speech path control memories (hereinafter referred to as "CTLM"), and a read/write address counter, and is provided with following functions.

An SPM stores digitally coded voice information on the data highway. The storage capacity of the SPM corresponds to the total number of time slots (channels) for the highways related to the time switch, i.e. the product of highway multiplexing and the number of highways. An CTLM is a memory to specify write and read addresses for the speech memory. The read/write address counter generates sequential addresses for sequential reading or writing of digitally coded voice information to be sent to the highway at the speech memory and control memory.

In an actual digital exchange, a plurality of highways from the transmission line are gathered to form a highly multiplexed highway, which is then connected to a time switch.

When the multiplexing of a time switch is 1024 (unit capacity for time switch), it is necessary for that time switch to make high speed processing with a memory cycle time of 60 ns in order for writing/reading within one time slot (122 ns). Recent advance in semiconductor technology has brought some memory devices ensuring a cycle time of not more than 60 ns, and solves this operation speed problem of memory devices. At present, time switches with multiplexing of 1024 (unit capacity for time switch) using write/read alternating method are adopted. Since one voice channel is coded in 8 bits, serial 8 bit data (contents at addresses 0 to 1023 in speech memory) are paralleled for multiplexing so that the number of channels to be sent in the same time period becomes eight times. Such paralleling is executed by a serial/parallel converter at the stage immediately before the switch. Thus, data exchange is executed with the speech memory of the time switch being also parallel.

As shown in FIG. 10, a time switch exists on a highway 708 (input side) with n channels. Serial data 702 where one frame with a cycle of 125 us has multiplexed data for n channels (One channel contains eight bits; it can be 16 bits at most) synchronizes with the output signal from an address counter 704 with a cycle of n for sequential writing to a speech memory 701 by means of a write circuit 703. In the speech memory 701, data are written corresponding to the addresses 1 to n (in this example, in the order from A to E). Then, the data A to E for n channels (t1 to tn) once stored in the speech memory 701 are, corresponding to the sequential addresses specified by a control memory 706 (n, 3, 2, ..., 1 and n-1 in this example), read to the highway 708 (output side) by means of a read circuit 705. Thus, the n input channels and n output channels are switched. The control memory 706 contains correlations between the input time slots and output time slots.

In a conventional TDSW test method, a TDSW is supplied with a manually prepared test pattern from the test equipment instead of data input signals and write address signals from the connected microcomputer in normal operation, so that the results of TDSW processing for the test pattern are compared with the expected values stored in the test equipment.

Such conventional TDSW test method requires a time-consuming process to manually prepare the test pattern needed for the test. In addition, it is necessary to operate the test pattern to be input to the CTLM at a low speed as describe above, and the timing with the test pattern supplied to the SPM at a high speed must be also considered. Suppose, for example, a TDSW has multiplexing of 8K. In this case, reading at CTLM and SPM is made at the clock of 64 MHz, but writing to the CTLM is made at 8 MHz. Since one clock usually consists of one test pattern, eight test patterns are required to represent an 8 MHz clock. For writing to the CTLM in this TDSW with 8K multiplexing, 8×8K=64K of test patterns are required.

Further, the above test patterns must be supplied two to four times to improve the failure detection rate, which prolongs the time required for the test. Specifically, if 64K test patterns in the above example are supplied twice, the total number of patterns becomes 128K.

SUMMARY OF THE INVENTION

It is an object of the present invention to provide a time division switch enabling a test method much more effective than the conventional method where manually prepared test patterns are supplied from outside of the TDSW.

It is another object of the present invention to largely reduce the number of man-hours required for the test by eliminating the need of manual preparation process for test patterns.

According to a preferred embodiment of the present invention to attain the first object above, a time division switch for digital exchange systems comprises speech data storage means to store digitally coded speech data to be transmitted on the data highway, control data storage means to store control data for input/output control of speech data at the speech data storage means, address generator means to generate sequential addresses for reading and writing of data at the speech data storage means and the control data storage means, write means to write data to the speech data storage means according to the sequential addresses generated by the address generator means, read means to read data from the speech data storage means according to the control data stored in the control data storage means, and test execution means to switch between normal mode for processing of the speech data and test mode to check for any failure in the speech data storage means and the control data storage means.

According to another preferred embodiment, the test execution means further comprises test pattern generator means to generate, upon input of the test start signal, test patterns to detect for any failure at the speech data storage means and the control data storage means and switch means which, under the condition that the speech data signal to be sent to the speech data storage means, the control data signal and write address to be sent to the control data storage means and the test patterns corresponding to such data signals and write address signals are input and that the test start signal is input, supplies the speech data storage means and the control data storage means with the applicable test patterns output from the test pattern generator means in place of the data signals and write address signals.

According to another preferred embodiment, a time division switch for digital exchange systems comprises speech data storage means to store digitally coded speech data to be transmitted on the data highway, control data storage means to store control data for input/output control of speech data at the speech data storage means, address generator means to generate sequential addresses for reading and writing of data at the speech data storage means and the control data storage means, write means to write data to the speech data storage means according to the sequential addresses generated by the address generator means, read means to read data from the speech data storage means according to the control data stored in the control data storage means, test pattern generator means to generate, upon input of the test start signal, test patterns to detect for any failure at the speech data storage means and the control data storage means and switch means which, under the condition that the speech data signal to be sent to the speech data storage means, the control data signal and write address to be sent to the control data storage means and the test patterns corresponding to such data signals and write address signals are input and that the test start signal is input, supplies the speech data storage means and the control data storage means with the applicable test patterns output from the test pattern generator means in place of the data signals and write address signals.

According to a still preferred embodiment, the test pattern generator means comprises counter circuits to output binary code data and the data for generation of compliments corresponding to the binary code data synchronizing with the clock signal upon input of the test start signal and logic synthesis circuits which perform logic synthesis of the binary code data and the data for compliment generation output from the counter circuits, the binary code data output from the counter circuits being sent to the control data storage means as the test patterns corresponding to the write address signal of the control data storage means and the binary code data synthesized by the logic synthesis circuits being sent to the control data storage means and the speech data storage means as the test patterns corresponding to the control data signal to be written to the control data storage means and the speech data signal to be written to the speech data storage means.

According to a still another preferred embodiment, each of the counter circuits comprises a ring counter consisting of a clock input terminal, a reset terminal, output terminals to output binary code data and an output terminal to output data for compliment generation, and is characterized by that the clock input terminal serves for input of clock signals, the reset terminal serves for input of the test start signal, the binary code data is, upon input of the test start signal, output for a plurality of times from the output terminals for output of the binary code data synchronizing with the clock signals, and the output terminal to output the data for compliment generation does not output any data for compliment generation for the first output of the binary code data and outputs the data for compliment generation for the second output of the binary code data.

According to a further preferred embodiment, a time division switch for digital exchange systems comprises speech data storage means to store digitally coded speech data to be transmitted on the data highway, control data storage means to store control data for input/output control of speech data at the speech data storage means, address generation means to generate sequential addresses for reading and writing of data at the speech data storage means and the control data storage means, write means to write data to the speech data storage means according to the sequential addresses generated by the address generator means, read means to read data from the speech data storage means according to the control data stored in the control data storage means, and test execution means to switch among normal mode for processing of the speech data, the first test mode to check for any failure in the speech data storage means and the control data storage means and the second test mode to check for any failure at the sampling data output means.

According to a further preferred embodiment, the test execution means further comprises test pattern generator means to, upon input of the test start signal, generate the first test patterns to detect for any failure at the speech data storage means and the control data storage means or the second test patterns to check for any failure at the sampling data output means and upon input of the pattern switching signal, switch between the first and second test patterns, and switch means which, under the condition that the speech data signal to be sent to the speech data storage means, the control data signal and write address to be sent to the control data storage means and the first or second test patterns corresponding to such data signals and write address signals are input and that the test start signal is input, supplies the speech data storage means and the control data storage means with the first or second test patterns output from the test pattern generator means in place of the data signals and write address signals.

According to a still preferred embodiment, a time division switch for digital exchange systems comprises speech data storage means to store digitally coded speech data to be transmitted on the data highway, control data storage means to store control data for input/output control of speech data at the speech data storage means, address generator means to generate sequential addresses for reading and writing of data at the speech data storage means and the control data storage means, write means to write data to the speech data storage means according to the sequential addresses generated by the address generator means, read means to read data from the speech data storage means according to the control data stored in the control data storage means, a sampling data output means to output some arbitrary data among the speech data, test pattern generator means to, upon input of the test start signal, generate the first test patterns to detect for any failure at the speech data storage means and the control data storage means or the second test patterns to check for any failure at the sampling data output means and upon input of the pattern switching signal, switch between the first and second test patterns, and switch means which, under the condition that the speech data signal to be sent to the speech data storage means, the control data signal and write address to be sent to the control data storage means and the first or second test patterns corresponding to such data signals and write address signals are input and that the test start signal is input, supplies the speech data storage means and the control data storage means with the first or second test patterns output from the test pattern generator means in place of the data signals and write address signals.

According to another preferred embodiment, the test pattern generator means comprises a function verification pattern generation circuit which, upon input of the test start signal, outputs binary code data for function verification synchronizing with the applicable clock signal, a counter circuit which, upon input of the test start signal, outputs binary code data for memory test and data to generate compliments corresponding to such binary code data for memory test, and a logic synthesis circuit to perform logic synthesis of the binary code data for memory test and the data to generate compliments output from the counter circuit, and is characterized by that, for the first test patterns, the binary code data for memory test output from the counter circuit is sent to the control data storage means as the test patterns corresponding to the write address signal of the control data storage means and the binary code data obtained at the logic synthesis circuit is sent to the control data storage means and the speech data storage means as the test patterns corresponding to the control data signal to be written to the control data storage means and the speech data signal to be written to speech data storage means and, for the second test patterns, the binary code data for function verification output from the function verification pattern generation circuit is sent to the control data storage means and the speech data storage means as the test pattern corresponding to the data signals and write address signals.

According to a still another preferred embodiment, the counter circuit comprises a ring counter consisting of a clock input terminal, a reset terminal, output terminals to output binary code data and an output terminal to output data for compliment generation, and is characterized by that the clock input terminal serves for input of clock signals, the reset terminal serves for input of the test start signal, the binary code data for memory test is, upon input of the test start signal, output for a plurality of times from the output terminals for output of the binary code data synchronizing with the clock signals, and the output terminal to output the data for compliment generation does not output any data for compliment generation for the first output of the binary code data for memory test and outputs the data for compliment generation for the second output of the binary code data for memory test.

According to a further preferred embodiment, the function verification pattern generator circuit comprises a clock input terminal, a reset terminal and output terminals for the same number as the output terminals at the counter circuits and is characterized by that the clock input terminal serves for input of the clock signal, the reset terminal serves for input of the test start signal and, upon input of the test start signal, the binary code data for function verification is output from the output terminals with synchronizing with the clock signal.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Referring to the attached figures, preferred embodiments of the present invention will be described below in details.

Figure 1:
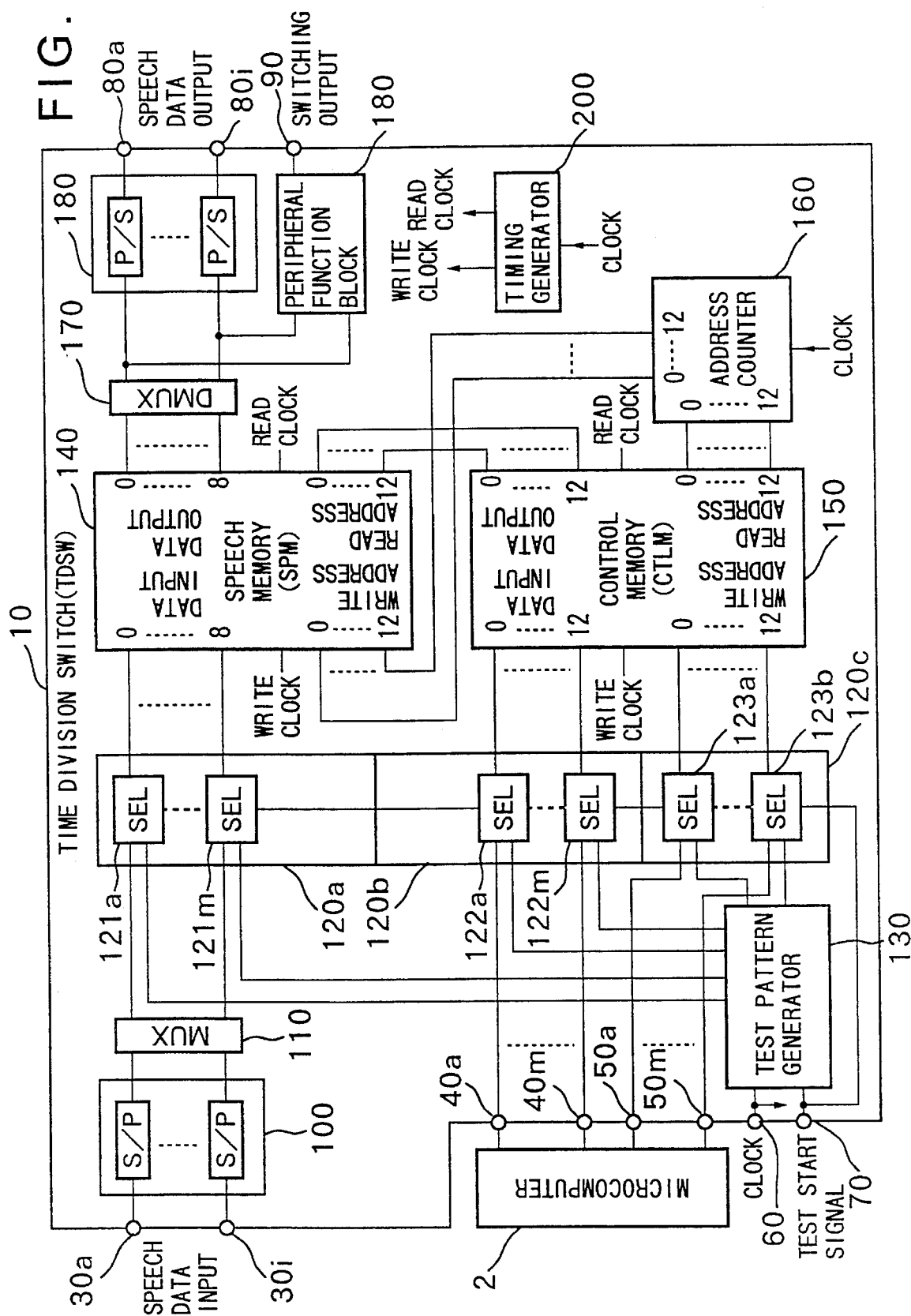
FIG. 1 is a block diagram to show the configuration of a TDSW in a first embodiment of the present invention.
Figure 10:
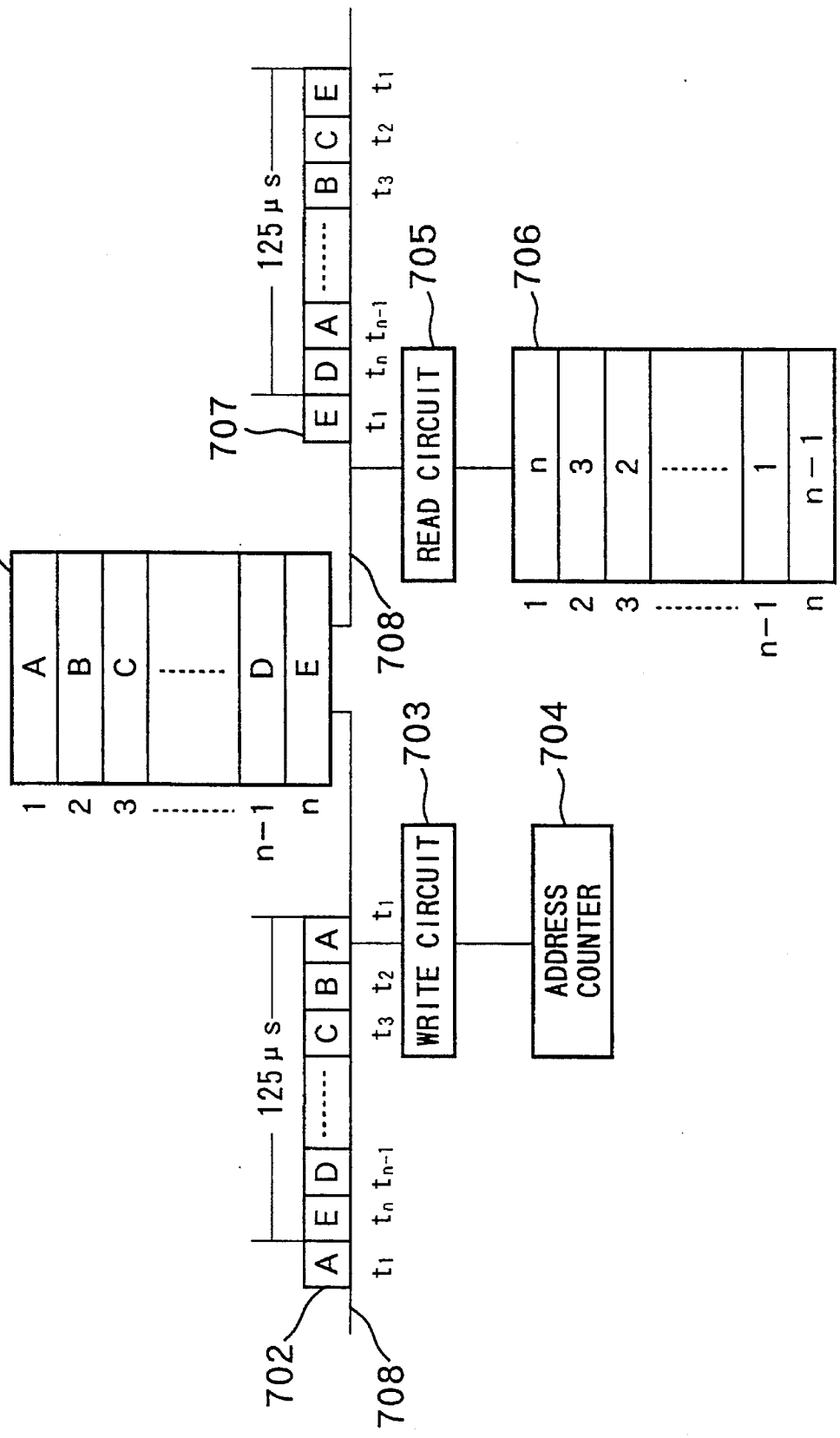
FIG. 10 is a diagram to show a TDSW according to the prior art.

FIG. 1 is a block diagram to show a TDSW according to a first embodiment of the present invention. The TDSW of the present invention is, similarly to the conventional TDSW shown in FIG. 10, located on an input/output highway. Referring to the figure, the TDSW 10 of this embodiment is usually connected to a microcomputer 20 to control the TDSW 10 for normal operation; For test, on the other hand, it is connected to a test equipment (now shown), which supplies the test start signal and clocks in place of the microcomputer 201.

The TDSW 10 comprises an address counter 160, a timing generator 200 to generate write clocks and read clocks using the clocks supplied from the test equipment via an input terminal 60, an S/P 100 to convert the speech data received via input terminals 30a to 30i from the test equipment as serial signals into a plurality of parallel signals, an MUX 110 to receive such plurality of parallel signals from the S/P 100 and output multiplexed serial signals of 9 bits (including 8 data bits and 1 check code bit), an SEL 120 a to selectively output, in response to the test start signal, either of the test pattern supplied from a test pattern generator 130 or the 9 bit serial signal supplied from the MUX 110, a CTLM 150 which receives the signal selected at the SEL 120b at a data input terminal and the signal selected at the SEL 120c at a write address input terminal and sequential address signal output from the address counter 160 at a read address input terminal, an SPM 140 to sequentially write the 9 bit input data supplied from the SEL 120a to the memory in response to the write addresses from the address counter 160 and to receive the address signal to read out thus written memory contents supplied from the data output terminal of the CTLM 150, and to output from the data output terminal the specified memory address data in response to such signal, a DMUX 170 to serve for multiplex separation of the 9 bit multiplexed serial signal read out of the SPM 140 into a plurality of parallel signals and a P/S 180 to convert the plurality of parallel signals from the DMUX 170 into serial signals and to supply them to the test equipment via output terminals 70a and 70b and a peripheral function block 190 to receive a plurality of parallel signals from the DMUX 170 and output the switching output signal via the output terminal 90.

Next, the operation of the first embodiment according to the present invention will be described referring to attached figures.

Figure 2:
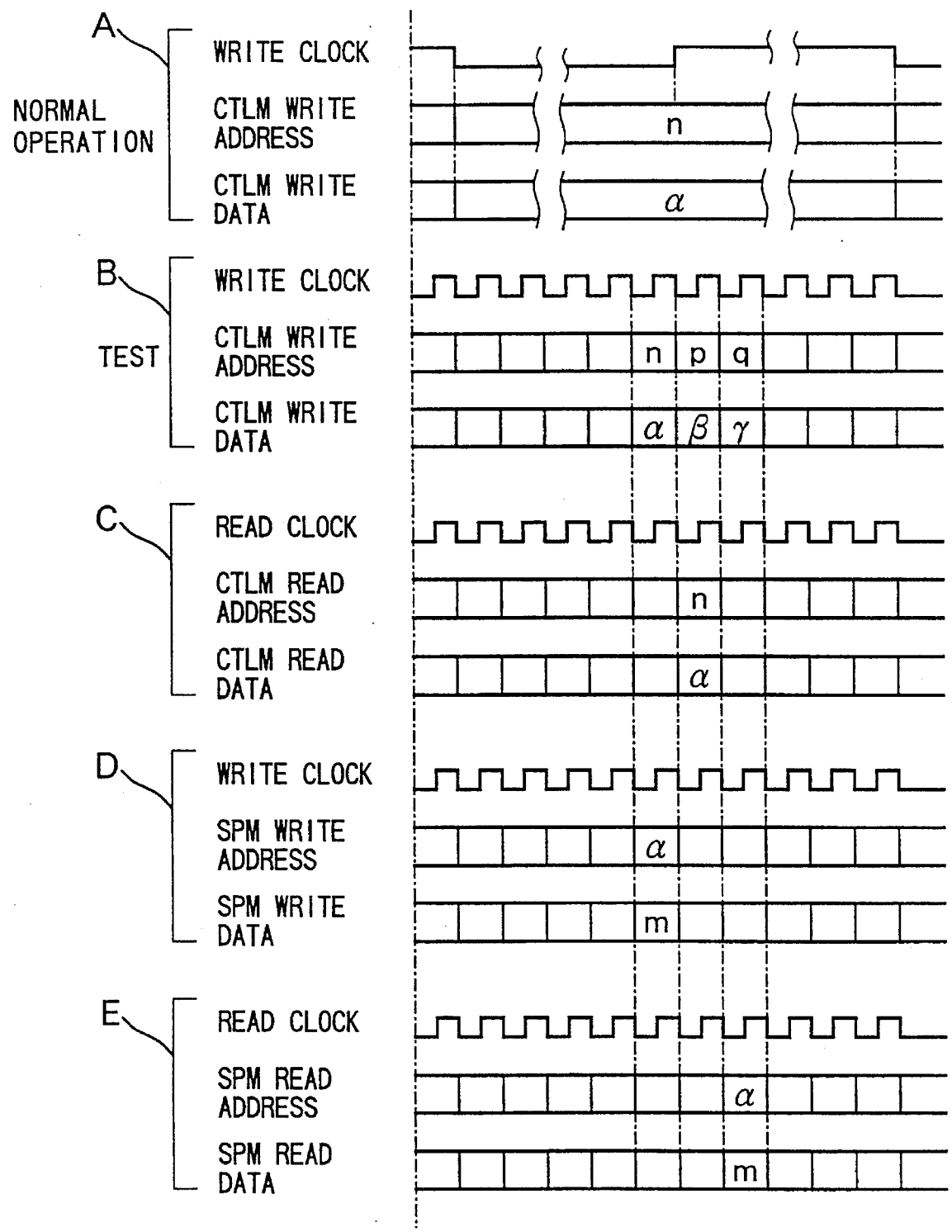
FIG. 2 is a time chart to illustrate the operation in the first embodiment of the present invention.

Referring to FIG. 2, which is a timing chart to illustrate the first embodiment of FIG. 1, normal operation of the TDSW 10 is described first. As shown in FIG. 2(a), the external microcomputer 20 specifies, at its operation speed (slow clock), the write address n for the CTLM 150 so that the CTLM write data alpha supplied from the microcomputer 20 is written to the memory pointed by the address n, synchronizing with the write clock. Further, as shown in FIG. 2 (b), speech data m applied by the test equipment and supplied to the SEL 120a via the S/P 100 and the MUX 110 is written to the memory with the address specified by the SPM write address alpha, which is generated by the address counter 160. As shown in FIG. 2 (c), the data alpha stored in the CTLM 150 at the same clock timing is read out in response to the CTLM read address n generated by the address counter 160. As shown in FIG. 2 (e), the data alpha thus read out has a delay of one clock from the read clock for the CTLM 150, or two clocks from the SPM write clock timing. It serves as the SPM read address alpha and at the address specified by the address alpha, the data already stored or the speech data m is read out.

Such speech data m is output to outside, on one hand via the output terminals 80a to 80i after application to DMUX 170 at the next stage of the SPM 140 and P/S conversion at the P/S 180 and on the other hand via the output terminal 90 after application to the peripheral function block 190 for appropriate processing.

The TDSW operates in the same way for the test, and the test makes use of such operation.

Figure 3:
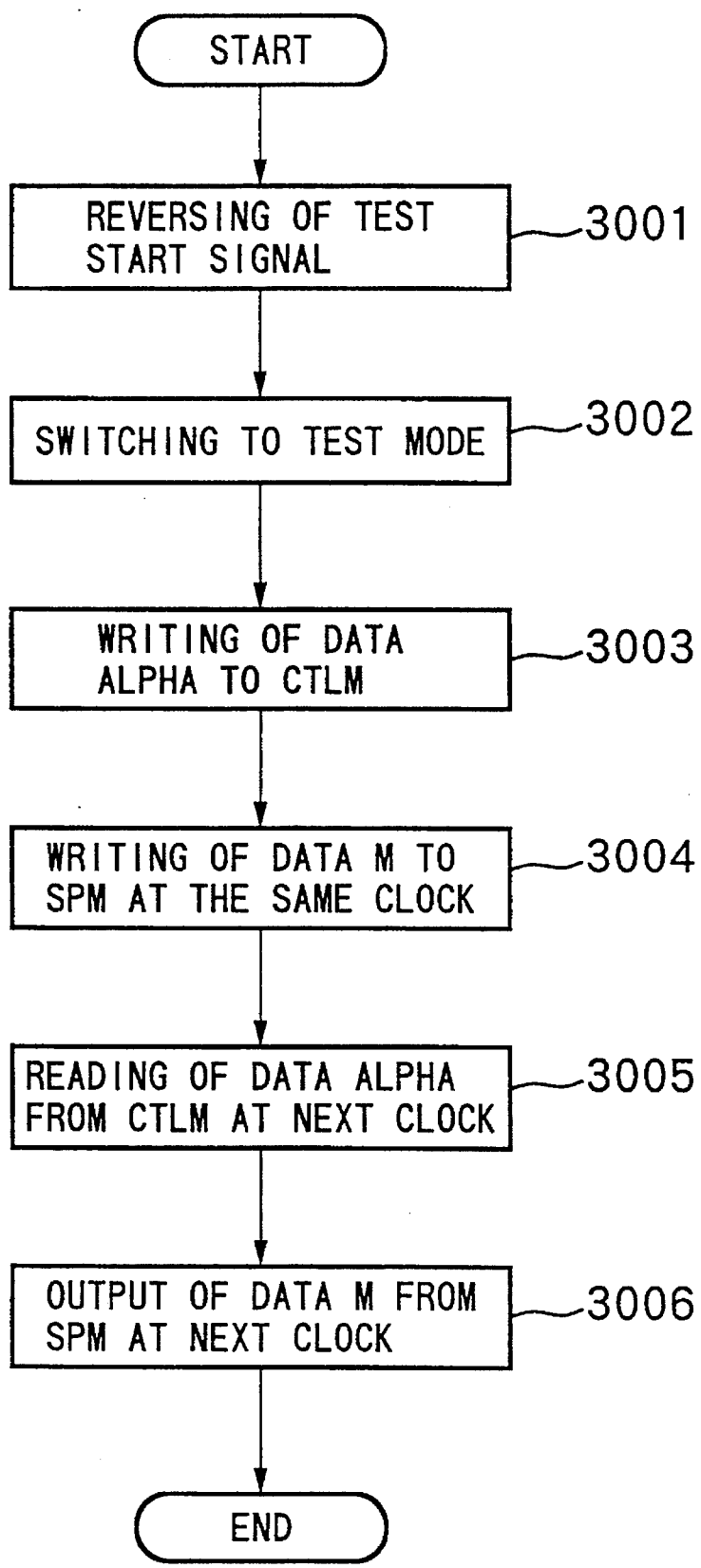
FIG. 3 is a flowchart to illustrate the operation in the first embodiment of the present invention.

Referring next to the block diagram of FIG. 1 and the flowchart of FIG. 3, the operation during the test is described below.

The test start signal applied to the input terminal 70 is reversed to cause the test mode (Step 3001). Each of the SEL 120a, SEL 120b and SEL 120c selects the test pattern supplied from the test pattern generator 130 for output. This causes the data input of the SPM 140 and the data input and write address of the CTLM 150 to be switched to test mode (Step 3002).

Referring again to FIG. 2, switching to test mode causes the SEL 120b and SEL 120c to supply CTLM write address and CTLM write data and causes the timing generator 200 to supply clocks, both for the CTLM 150. The clock supplied here is not at a slow speed as that supplied from the microcomputer 20 in normal operation, but is the highest speed clock that allows operation inside the TDSW 10, generated by the timing generator 200. Under such situation, as shown in FIG. 2(b), the data alpha is written, for example, to the address n of CTLM 150 (Step 3003). Further, as in FIG. 2(d), in response to the SPM write address alpha supplied from the address counter 160 at the same clock timing, the data m supplied from the test pattern generator 130 is selected by the SEL 120a and written to the memory specified by the address of SPM 140 specified by the data alpha (Step 3004). Then, as in FIG. 2 (c), the data alpha of the memory specified by the CTLM read address n supplied from the address counter 160 at the next clock timing is read out of the CTLM 150 (Step 3005). Then, as in FIG. 2 (E), the data alpha serves as the read address for SPM 140 and the data m of the memory specified by the data alpha at the next clock timing is output from the data output terminals 80a to 80i and 90 from the SPM 140 (Step 3006). In other words, the above series of procedures causes a test to be conducted not at a low speed clock supplied from the microcomputer 20 during normal operation as described above but at the clock with the maximum operation speed for operation of the inside of the TDSW 10 and at least in 3 clocks.

The test pattern generator automatically prepares test patterns which enable the above test in minimum time duration (minimum number of test patterns) with improving the failure detection rate.

Referring again to FIG. 2, CTLM write address n=0, CTLM write data alpha=0, CTLM write address p=1, CTLM write data beta=1, CTLM write data q=2, CTLM write data gamma=2. The above procedures are sequentially executed with an increment of one. Corresponding to their execution, SPM write data is also incremented by 1 from m=0. With all addresses written, or with 8192 addresses from 0 to 8191, following the first frame where data are written up to 8191 (Cycle 1), the second frame to write the compliments of the data (Cycle 2) is executed: CTLM write address n=0, CTLM write data alpha=complement of 0 (8191), CTLM write address p=1, CTLM write data beta=complement of 1 (8190), CTLM write address q=2, and CTLM write data gamma=compliment of 2 (8189).

During the test by such method, the devices in the TDSW 10 are all changed from 0 to 1 and 1 to 0. These execution results are sent to the test equipment via the output terminals 80a to 80i and the output terminal 90. At the test equipment, the execution results are compared with the expected values set in advance so as to provide "GO" for matching and NO GO for unmatching. Therefore, the TDSW 10 incorporating such test pattern generator 130 easily improves the failure detection rate.

As described above, all addresses are written at least twice for the test according to this embodiment, which means that at least 16K patterns are required. This realizes a largely improved efficiency from the prior art where as many as 128K patterns are required to test all addresses twice (in case of 8K multiplexing).

Next, the test pattern generator 130 incorporated in the TDSW 10 is described.

Figure 4:
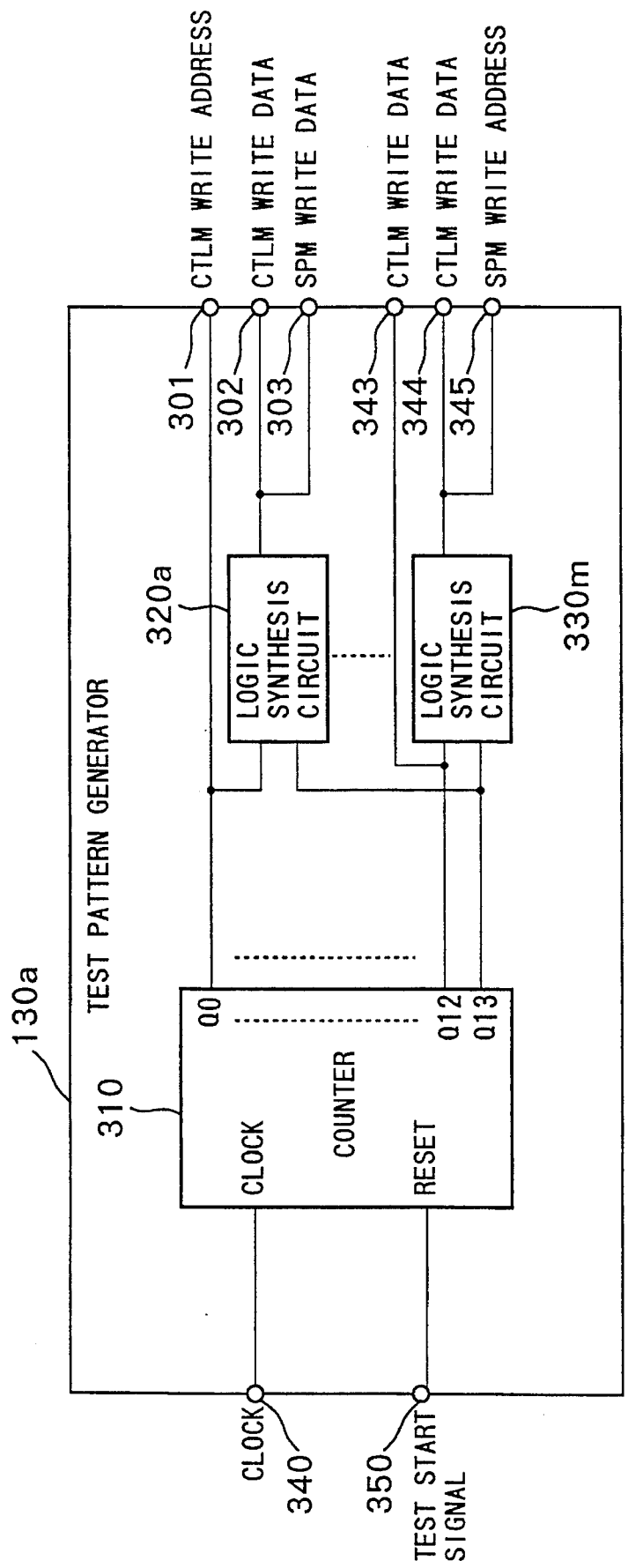
FIG. 4 is a block diagram of a test pattern generator incorporated in the TDSW of FIG. 1.

FIG. 4 is a block diagram of the test pattern generator 130 incorporated in the TDSW 10 of FIG. 1. In this embodiment, the test pattern generator 130a generates 8192 patterns for one frame; it generates data from 0 to 8191 in Cycle 1 and complements of Cycle 1 data in Cycle 2.

Referring now to FIG. 4, the test pattern generator 130a comprises a counter 310 and logic synthesis circuits 320a to 320m. Though the test pattern generator 130 actually requires 13 pairs of logic synthesis circuit and its output terminal for 8K multiplication, for ease of explanation, only two pairs of them are shown in the figure. The logic synthesis circuits 320a to 320m are constituted with exclusive OR.

The counter 310 is a ring counter comprising a clock input terminal, a reset terminal and 13 binary code input terminals corresponding to the frame data 0 to 8191 and a binary code output terminal for compliment generation. The clock terminal is supplied with the clock from the input terminal 340 and the reset terminal is supplied with the test start signal from the input terminal 350. Though the explanation below only describes the output Q0 for ease of explanation, it is understood that Q1 to Q12 operate in the same way as Q0.

The signal from the output Q0 is on one hand output via the output terminal 301 as the CTLM write address signal, and on the other hand sent for logic synthesis with the output Q13 at a logic synthesis circuit 320a. The logic synthesis circuit 320a outputs data via the output terminal 302 as the CTLM write data, and via the output terminal 303 as the SPM write data. Similarly, the signals from the output Q12 and other outputs Q1 to Q11 (not shown) are on one hand provided to the corresponding output terminal as the CTLM write address signal and on the other hand sent to the applicable logic synthesis circuit for logic synthesis. The result obtained at the logical synthesis circuit is output via the corresponding SPM terminal as the CTLM write data and via the output terminal as the SPM write data.

Next, the operation of the test pattern generator 130a will be described with referring to figures.

Figure 5:
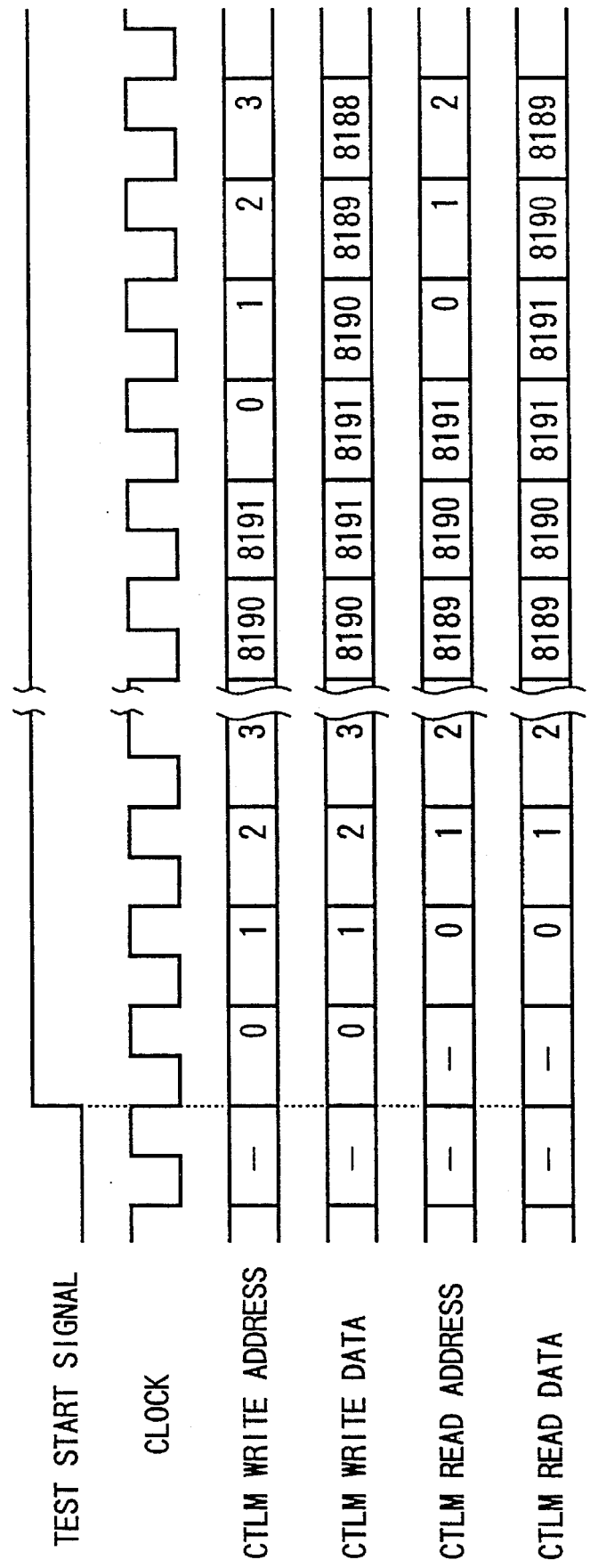
FIG. 5 is a timing chart to illustrate the operation for CTLM to write/read the data generated by the test pattern generator of FIG. 4.
Figure 6:
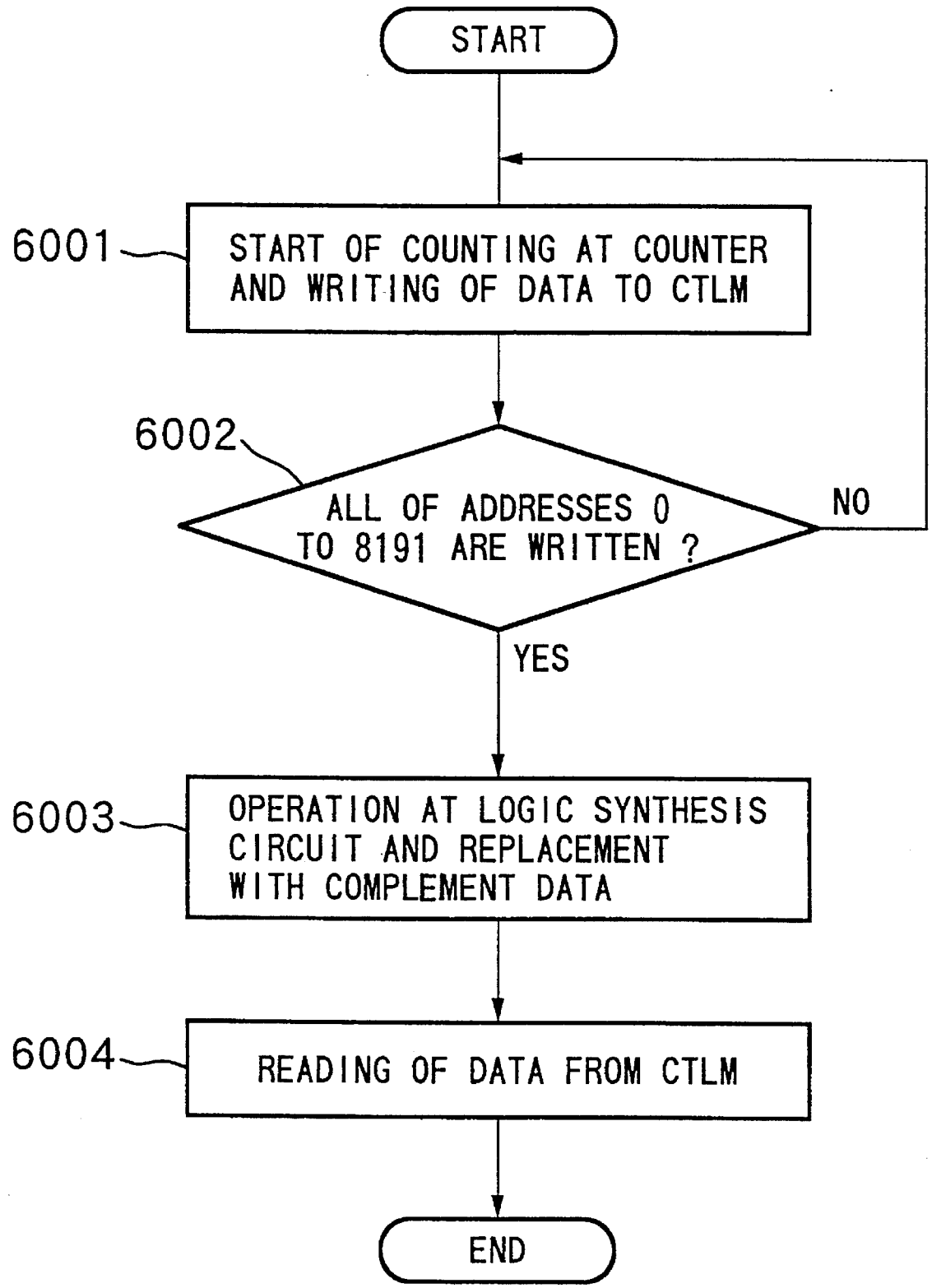
FIG. 6 is a flowchart to illustrate the operation for CTLM to write/read the data generated by the test pattern generator of FIG. 4.
Figure 7:
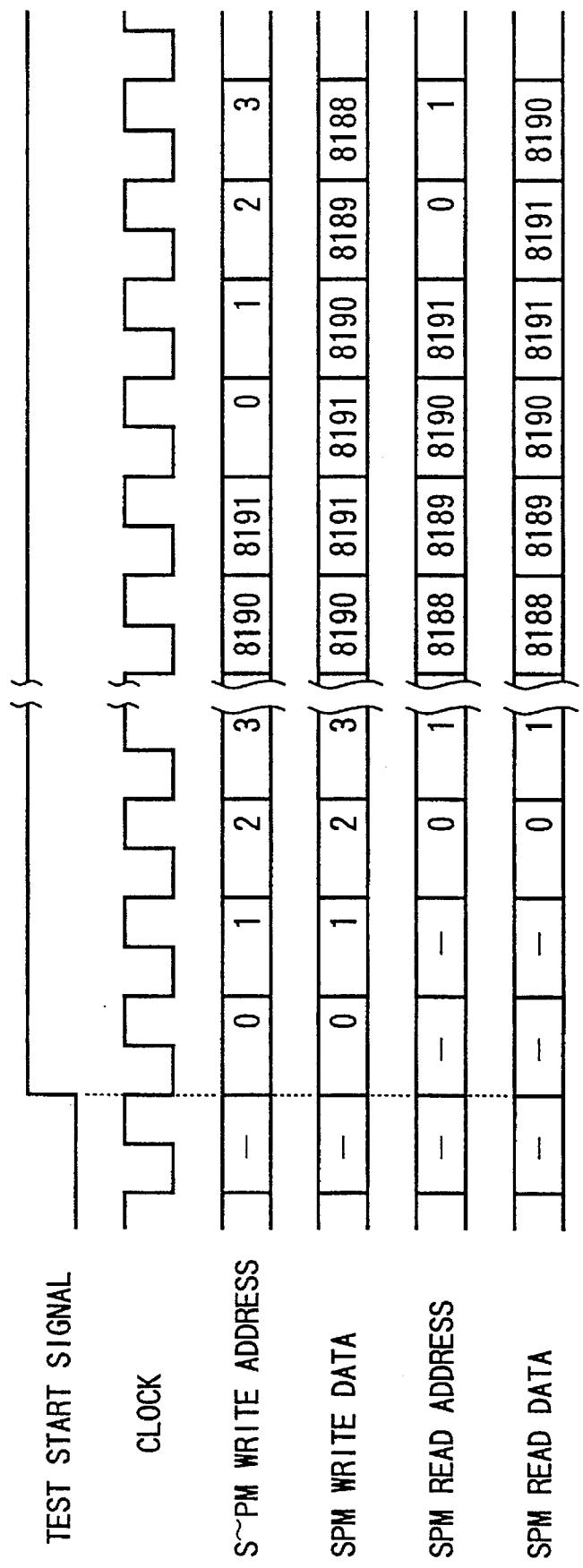
FIG. 7 is a timing chart to illustrate the operation for SPM to write/read the data generated by the test pattern generator of FIG. 4.
Figure 8:
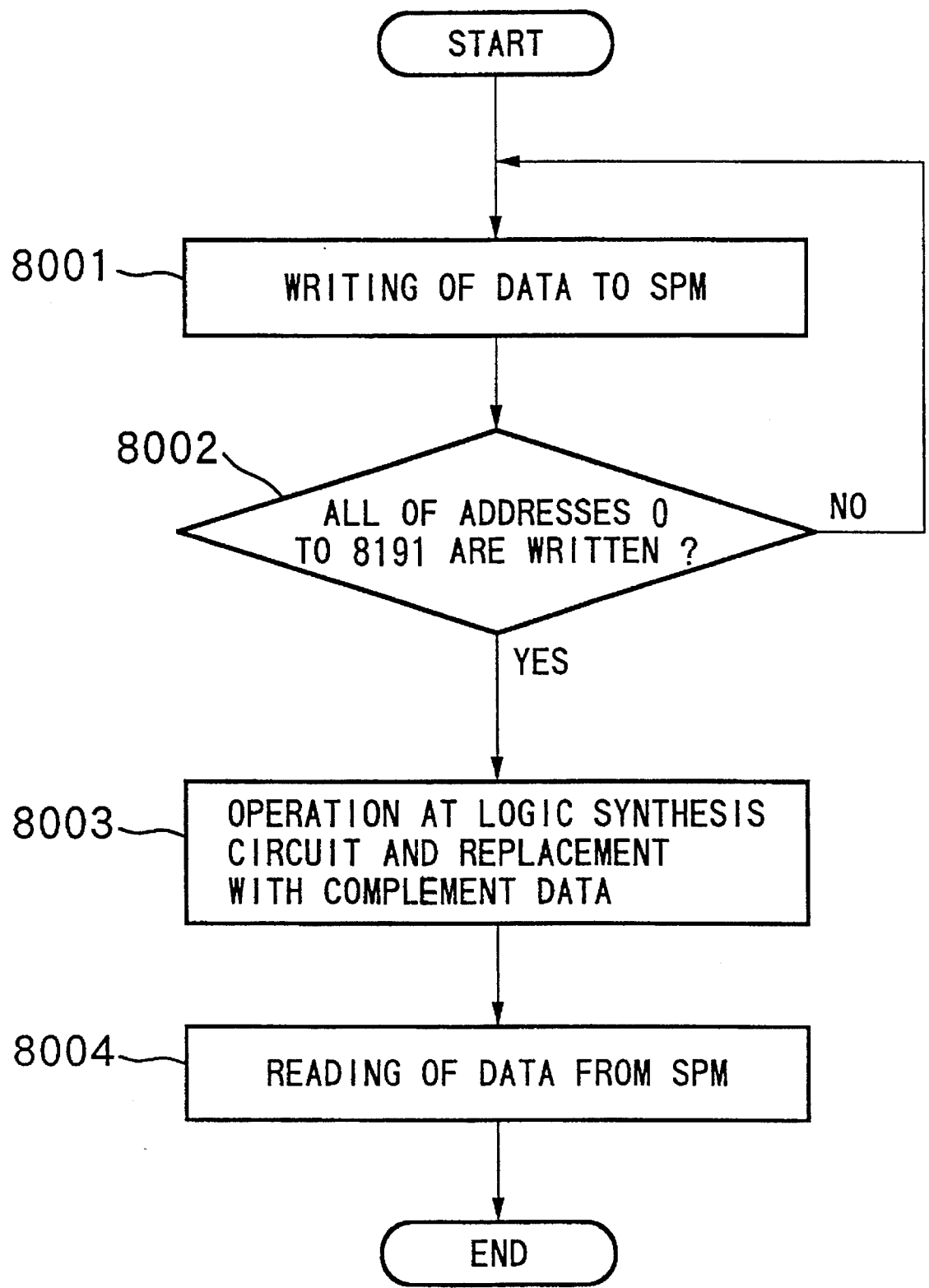
FIG. 8 is a flowchart to illustrate the operation 20 for SPM to write/read the data generated by the test pattern generator of FIG. 4.

FIG. 5 is a timing chart to illustrate writing and reading of the data generated by the test pattern generator 130a to the CTLM 150. FIG. 6 is a flowchart to illustrate the same operation. FIG. 7 is a timing chart to illustrate the operation of writing and reading of the data generated by the test pattern generator 130a to the SPM 140. FIG. 8 is a flowchart to illustrate the same operation.

Referring to FIGS. 5 and 6, when the test is started, the counter 310 starts counting and at the same time outputs the CTLM write address from the output terminal 301, CTLM write data from the output terminal 302 and SPM write data from the output terminal 303 (Step 6001). Therefore, the CTLM write address 0 is provided with data 0, the address 1 with data 1. This procedure is performed for each address up to the address 8191 (Step 6002). Then, when these procedures for one cycle are completed, the logic synthesis circuit 320a exclusively ORs each data and the counter output signal Q13 at the final stage of the counter 310. As the result of such operation to obtain the exclusive OR, the compliments of the data are output (Step 6003). Specifically, the address 0 is provided with the compliment data 8191, and the address 1 with the compliment data 8190.

Then, the data in the memory specified by the CTLM read address is read at the timing with a delay of one clock from the write clock for the CTLM write address for the counter start timing adapted by the initial value setting function of the address counter 160. Referring to FIGS. 7 and 8, the SPM 140 is supplied with the SPM write data at the same timing as the CTLM write address. As in the case for CTLM, the SPM write address 0 is provided with data 0, the address 1 with data 1 (Step 8001). This procedure is performed for each address up to the address 8191 (Step 8002). Then, after one cycle of such procedures, the logic synthesis circuit 320a exclusively ORs each data and the counter output signal Q13 at the final stage of the counter 310 so that the compliments of the data are obtained to replace the data already written (Step 8003).

Then, the CTLM read data read out with a delay of one clock from the write timing to the CTLM 150 is supplied to the SPM 140 as the SPM read address. At the timing of the following clock, the data written in the SPM 140 is read out (Step 8004).

By performing such a series of procedures for two frames, i.e. (0 to 8191)×2 patterns, the failure detection rate at the memory, or the SPM 140 and the CTLM 150 can be improved.

Next, a second embodiment of the present invention is described referring to attached figures.

Figure 9:
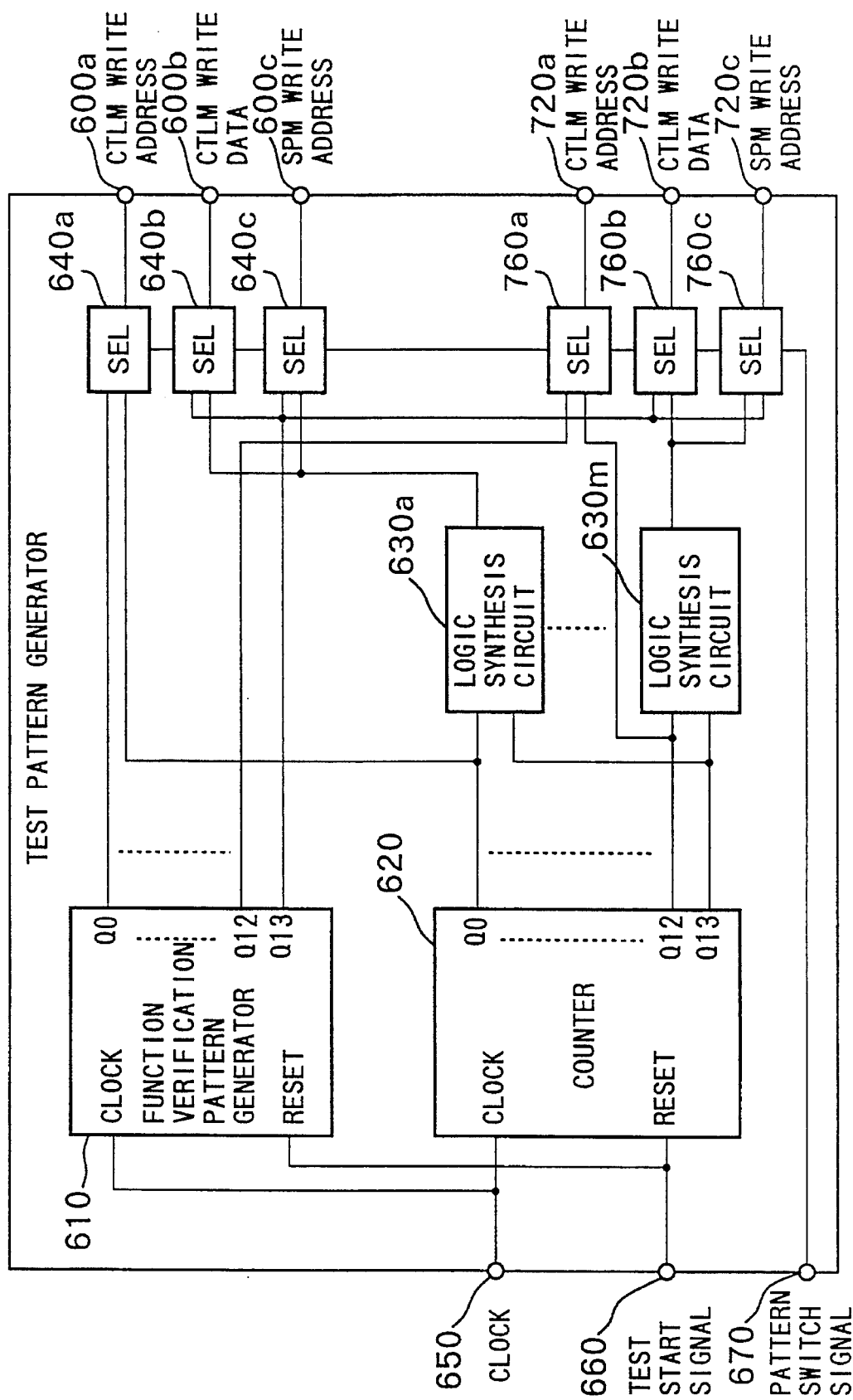
FIG. 9 is a block diagram of another test pattern generator according to a second embodiment of the present invention.

FIG. 9 is a block diagram to show a test pattern generator in a time division switch according to the second embodiment of the present invention.

The test pattern generator 130a in the first embodiment mainly tests the memory section of the TDSW, but the test pattern generator 130b in the second embodiment further verifies the peripheral function block incorporated in the TDSW.

Referring to FIG. 9, the test pattern generator 130b comprises a function verification pattern generator 640, a counter 620, logic synthesis circuits 630a to 630m, SEL 640a, 640b, 640c, ... 760a, 760b, and 760c, a clock input terminal 650, a test start signal input terminal 660, a patter switch signal input terminal 670, CTLM write address output terminals 600a to 720a, CTLM write data output terminals 600b to 720b and SPM write address output terminals 600c to 720c. In other words, corresponding to 13 bits of output signals Q0 to Q13 at the counter 620, it has 13 logic synthesis circuits and 39 SEL and 39 SEL output terminals. For easier understanding, however, the first and the thirteenth circuits alone are shown in the figure, and the description is given for the first bit only. For the remaining bits, the description is omitted since the basic operation is the same for all.

Then, the operation of the second embodiment will be described below.

Referring again to FIG. 9, the function verification pattern generator 610 is to test the peripheral function block 190 for the TDSW 10 shown in FIG. 1. The function verification pattern generator 610 has different circuit configurations for different functions to be verified and cannot be made as a common circuit. Therefore, it is designed to suit the function block where the generator is to be connected and incorporated into the TDSW 10. When it is supplied with a pattern switch signal via the input terminal 670, a pattern incorporated in it is output to SEL 640a, 640b and 640c. Since SEL 640a, 640b and 640c are in standby status after selecting the output signal from the function verification pattern generator 610 upon application of the pattern switch signal, they immediately send the test pattern via the output terminals 600a, 600b and 600c to the corresponding memories in the CTLM 150 and SPM 140. Here, the address specification for the CTLM 150 and the SPM 140 as well as the data writing and reading are executed in the same way as the first embodiment. The output data from the SPM 140 is supplied to the peripheral function block 190 connected to the later stage for function test. After that, the output signal from the peripheral function block 190 is applied to the test equipment via the output terminal 90. In the test equipment, the signals are compared with the expected values set in advance. When they are the same, it is judged GO, but when they are not the same, it is judged NO GO. Therefore, the TDSW 10 with such incorporated test pattern generator 130b easily improves the failure detection rate.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A time division switch for digital exchange systems comprising:

speech data storage means for storing digitally coded speech data for transmission on a data highway, control data storage means for storing control data for input/output control of speech data at said speech data storage means, address generator means for generating sequential read and write addresses for reading and writing of data at said speech data storage means and said control data storage means, write means for writing data to said speech data storage means according to the sequential addresses generated by said address generator means, read means for reading data from said speech data storage means according to the control data stored in said control data storage means, test pattern generator means for generating, upon input of a test start signal, test patterns for detecting failure at said speech data storage means and said control data storage means, and switch means which, when the speech data is sent to said speech data storage means, the control data and write address are sent to said control data storage means and said test patterns corresponding to said speech data and said control data, write address and said test start signal are input, supplies said speech data storage means and said control data storage means with the applicable test patterns output from said test pattern generator means in place of the speech data and said control data and write address.

2. A time division switch for digital exchange systems as set forth in claim 1, wherein said test pattern generator means comprises:

counter circuits for outputting binary code data and data for complement generation corresponding to said binary code data synchronized with a clock signal upon input of the test start signal, and logic synthesis circuits for performing logic synthesis of the binary code data and the data for complement generation output from said counter circuits, said binary code data output from said counter circuits being sent to said control data storage means as the test patterns corresponding to the write address of the control data storage means and the binary code data synthesized by said logic synthesis circuits being sent to said control data storage means and said speech data storage means as the test patterns corresponding to the control data written to the control data storage means and the speech data written to the speech data storage means.

3. A time division switch for digital exchange systems as set forth in claim 2, wherein each of said counter circuits comprises:

a ring counter comprising a clock input terminal, a reset terminal, output terminals for outputting binary code data and an output terminal for outputting data for complement generation, said clock input terminal for inputting said clock signal, said reset terminal for inputting said test start signal, said binary code data being, upon input of said test start signal, output a plurality of times from the output terminals for output of said binary code data synchronized with said clock signals, and said output terminal for outputting the data for complement generation does not output any data for complement generation during a first output of said binary code data and outputs the data for complement generation during a second output of said binary code data.

4. A time division switch for digital exchange systems comprising:

speech data storage means for storing digitally coded speech data for transmission on a data highway, control data storage means for storing control data for input/output control of speech data at said speech data storage means, address generator means for generating sequential read and write addresses for reading and writing of data at said speech data storage means and said control data storage means, write means for writing data to said speech data storage means according to the sequential addresses generated by said address generator means, read means for reading data from said speech data storage means according to the control data stored in said control data storage means, sampling data output means for outputting a plurality of arbitrary data among said speech data, test pattern generator means for, upon input of a test start signal, generating first test patterns for detecting failure at said speech data storage means and said control data storage means or second test patterns for detecting failure at said sampling data output means and, upon input of the pattern switching signal, switching between said first and second test patterns, and switch means which, when the speech data signal is sent to said speech data storage means, the control data and write address are sent to said control data storage means and said first or second test patterns corresponding to said control data and said speech data, said write address and said test start signal are input, supplies said speech data storage means and said control data storage means with the first or second test patterns output from said test pattern generator means in place of the control data and said speech data and said write address.

5. A time division switch for digital exchange systems as set forth in claim 4 wherein said test pattern generator means comprises:

a function verification pattern generation circuit for, upon input of the test start signal, outputting binary code data for function verification synchronized with a clock signal, a counter circuit for, upon input of the test start signal, outputting binary code data for memory test and data for complement generation corresponding to such binary code data for memory test, and a logic synthesis circuit for performing logic synthesis of the binary code data for memory test and the data for complement generation output from said counter circuit, wherein, for the first test pattern, the binary code data for memory test output from said counter circuit is sent to said control data storage means as the test pattern corresponding to the write address of the control data storage means and the binary code data obtained at said logic synthesis circuit is sent to said control data storage means and said speech data storage means as the test pattern corresponding to the control data written to the control data storage means and the speech data written to said speech data storage means, and for the second test pattern, the binary code data for function verification output from said function verification pattern generation circuit being sent to said control data storage means and said speech data storage means as the test pattern corresponding to the control data and said speech data and said write address.

6. A time division switch for digital exchange systems as set forth in claim 5, wherein each of said counter circuits comprises:

a ring counter comprising a clock input terminal, a reset terminal, output terminals for outputting binary code data and an output terminal for outputting data for complement generation, said clock input terminal for inputting said clock signals, said reset terminal for inputting said test start signal, said binary code data for memory test being, upon input of said test start signal, output a plurality of times from the output terminals for output of said binary code data synchronized with said clock signals, and said output terminal for outputting the data for complement generation does not output data for complement generation during a first output of said binary code data for memory test and outputs the data for complement generation during a second output of said binary code data for memory test.

7. A time division switch for digital exchange systems as set forth in claim 6, wherein said function verification pattern generator circuit comprises:

a clock input terminal, a reset terminal, and output terminals in a number equal to the number of output terminals of the counter circuits, and wherein said clock input terminal inputs said clock signal, said reset terminal inputs said test start signal and, upon input of said test start signal, the binary code data for function verification is output from said output terminals synchronized with said clock signal.

* * * * *